United States Patent
Daloze et al.

(10) Patent No.: US 10,248,349 B2
(45) Date of Patent: Apr. 2, 2019

(54) EFFICIENT AND THREAD-SAFE OBJECTS FOR DYNAMICALLY-TYPED LANGUAGES

(71) Applicant: Oracle International Corporation, Redwood Shores, CA (US)

(72) Inventors: Benoit Daloze, Linz (AT); Stefan Marr, Linz (AT); Daniele Bonetta, Vienna (AT)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 15/279,564

(22) Filed: Sep. 29, 2016

(65) Prior Publication Data

US 2017/0277467 A1    Sep. 28, 2017

Related U.S. Application Data

(60) Provisional application No. 62/311,750, filed on Mar. 22, 2016.

(51) Int. Cl.
*G06F 3/06* (2006.01)
*G06F 12/0891* (2016.01)

(52) U.S. Cl.
CPC .......... *G06F 3/0631* (2013.01); *G06F 3/0604* (2013.01); *G06F 3/0683* (2013.01); *G06F 12/0891* (2013.01); *G06F 2212/604* (2013.01)

(58) Field of Classification Search
None
See application file for complete search history.

(56) References Cited

U.S. PATENT DOCUMENTS

| | | | | |
|---|---|---|---|---|
| 6,049,838 A | * | 4/2000 | Miller | G06F 9/465 380/277 |
| 9,462,015 B2 | * | 10/2016 | Kamali | G06F 17/30241 |
| 2003/0097360 A1 | * | 5/2003 | McGuire | G06F 9/52 |
| 2005/0086662 A1 | * | 4/2005 | Monnie | G06F 9/544 719/310 |

(Continued)

OTHER PUBLICATIONS

"An Object Storage Model for the Truffle Language Implementation Framework", Andreas Wöß et al., Sep. 23, 2014 (12 pages).

(Continued)

*Primary Examiner* — Tuan C Dao
(74) *Attorney, Agent, or Firm* — Ferguson Braswell Fraser Kubasta PC

(57) ABSTRACT

A method may include creating objects by executing a program in a first thread. Creating the objects may include allocating, for each object, storage based on a shape assigned to the object. The storage may include separate, non-reusable storage locations. Each storage location may correspond to a field of the object. The shape may include a sharing status and a mapping of each field of the object to a storage location. The method may further include detecting that the program is initiating a second concurrent thread of execution, and designating a subset of objects as shared objects. Designating the subset of objects as shared objects may include setting the sharing status of the shape assigned to each shared object to indicate that the object is shared. The method may further include initiating tracking of shared objects and implementing a write barrier when writing to shared objects.

20 Claims, 10 Drawing Sheets

(56) References Cited

U.S. PATENT DOCUMENTS

2006/0037026 A1* 2/2006 Doherty ................. G06F 9/526
                                                        719/310
2009/0240869 A1* 9/2009 O'Krafka ............ G06F 12/0284
                                                        711/103

OTHER PUBLICATIONS

"Optimizing Dynamically-Typed Object-Oriented Languages With Polymorphic Inline Caches", Urs Hölzle et al., Jul. 1991 (18 pages).
"The Impact of Meta-Tracing on VM Design and Implementation", Carl Friedrich Bolz et al., Jan. 14, 2013 (30 pages).
"An Efficient Implementation of SELF, a Dynamically-Typed Object-Oriented Language Based on Prototypes", Craig Chambers et al., Oct. 25, 1989 (40 pages).
"Implementing Fast Java Monitors with Relaxed-Locks", David Dice, Apr. 23, 2001 (13 pages).
"The Definitive Guide to Jython: Python for the Java Platform", Josh Juneau et al., Jan. 2010 (539 pages).
"Zero-Overhead Metaprogramming: Reflection and Metaobject Protocols Fast and without Compromises", Stefan Marr et al., Apr. 2015 (10 pages).
"Simple and Fast Biased Locks", Nalini Vasudevan et al., Sep. 11, 2010 (9 pages).
"Self-Optimizing AST Interpreters", Thomas Würthinger et al., Oct. 22, 2012 (10 pages).
"Low-Overhead Software Transactional Memory with Progress Guarantees and Strong Semantics", Minjia Zhang et al., Feb. 7, 2015 (12 pages).

\* cited by examiner

EFFICIENT AND THREAD-SAFE OBJECTS FOR DYNAMICALLY-TYPED LANGUAGES

CROSS-REFERENCE TO RELATED APPLICATION

This application claims benefit under 35 U.S.C. § 119(e) to U.S. Provisional Patent Application Ser. No. 62/311,750, filed on Mar. 22, 2016, and entitled "EFFICIENT AND THREAD-SAFE OBJECTS FOR DYNAMICALLY-TYPED LANGUAGES." U.S. Provisional Patent Application Ser. No. 62/311,750 is incorporated herein by reference in its entirety.

BACKGROUND

Dynamically-typed languages are in widespread use, but lack effective support for multithreading. Although dynamic object representations are memory-efficient and flexible, permitting reshaping and resizing, they are not yet safe in multithreaded environments. For example, race conditions due to concurrently executing threads may cause unpredictable results. Current approaches to supporting multithreading in dynamically-typed languages include: disallowing sharing of objects between threads, imposing high synchronization overhead when accessing objects, and implementing objects in an unsafe manner, thereby burdening the application programmer with the task of performing synchronization in a safe manner.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including creating objects by executing a program in a first thread. Creating the objects includes allocating, for each object, storage based on a shape assigned to the object. The storage includes separate, non-reusable storage locations. Each storage location corresponds to a field of the object. The shape includes a sharing status and a mapping of each field of the object to a storage location. The method further includes detecting that the program is initiating a second concurrent thread of execution, and designating a subset of objects as shared objects. Designating the subset of objects as shared objects includes setting the sharing status of the shape assigned to each shared object to indicate that the object is shared. The method further includes initiating tracking of shared objects and implementing a write barrier when writing to shared objects.

In general, in one aspect, one or more embodiments relate to a system including a processor and a memory including instructions that, when executed by the processor, cause the processor to create objects by executing a program in a first thread. Creating the objects includes allocating, for each object, storage based on a shape assigned to the object. The storage includes separate, non-reusable storage locations. Each storage location corresponds to a field of the object. The shape includes a sharing status and a mapping of each field of the object to a storage location. The instructions further include detecting that the program is initiating a second concurrent thread of execution, and designating a subset of objects as shared objects. Designating the subset of objects as shared objects includes setting the sharing status of the shape assigned to each shared object to indicate that the object is shared. The instructions further include initiating tracking of shared objects and implementing a write barrier when writing to shared objects.

In general, in one aspect, one or more embodiments of the invention relate to a non-transitory computer readable medium including instructions that, when executed by a processor, perform a method including creating objects by executing a program in a first thread. Creating the objects includes allocating, for each object, storage based on a shape assigned to the object. The storage includes separate, non-reusable storage locations. Each storage location corresponds to a field of the object. The shape includes a sharing status and a mapping of each field of the object to a storage location. The method further includes detecting that the program is initiating a second concurrent thread of execution, and designating a subset of objects as shared objects. Designating the subset of objects as shared objects includes setting the sharing status of the shape assigned to each shared object to indicate that the object is shared. The method further includes initiating tracking of shared objects and implementing a write barrier when writing to shared objects.

Other aspects of the invention will be apparent from the following description and the appended claims.

DETAILED DESCRIPTION

Figure 1:
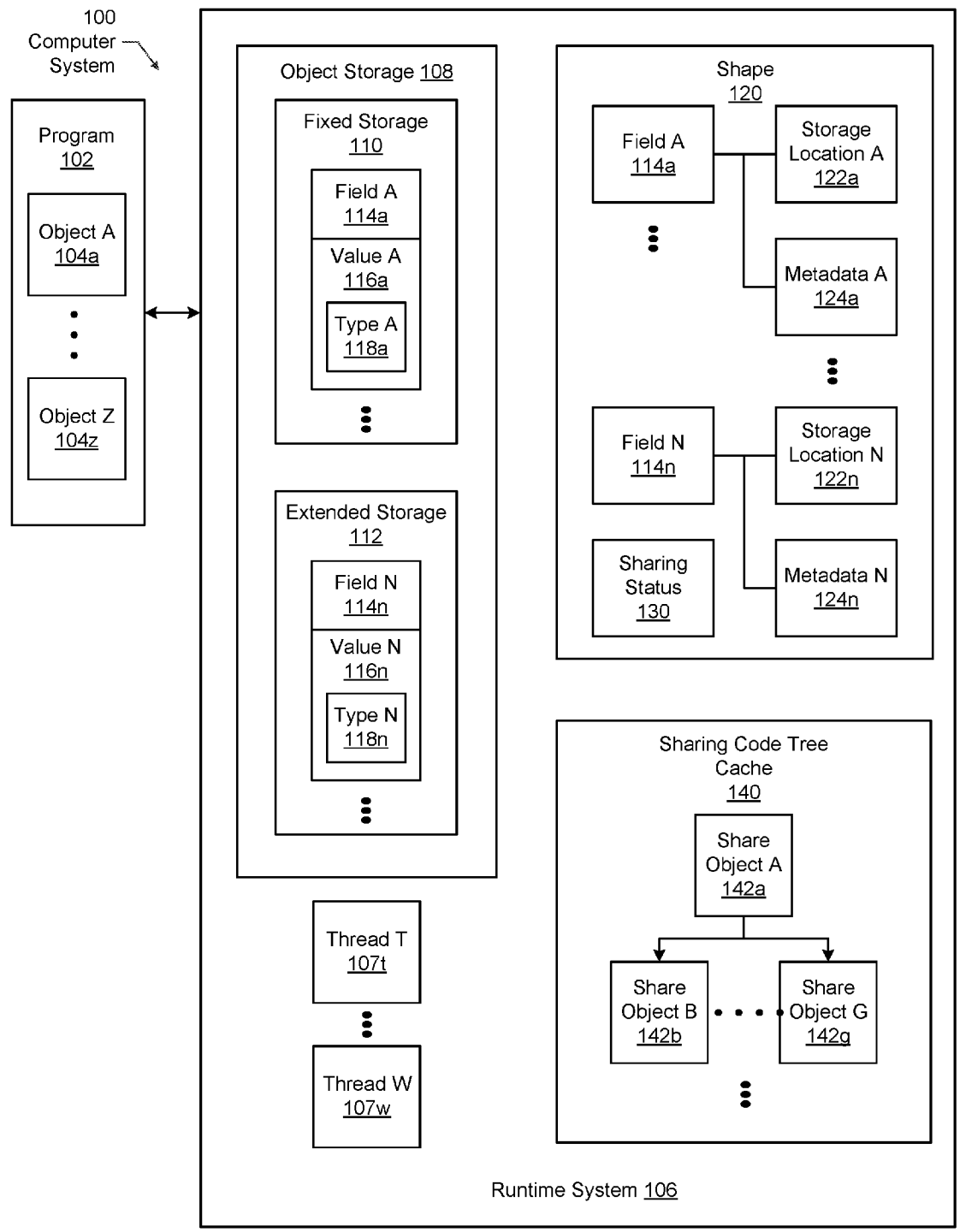
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system and non-transitory computer readable medium for implementing efficient, thread-safe dynamic objects generated using a programming language that does not require static type information to be associated with objects. In particular, one or more embodiments are directed to a method that embeds the sharing status of an object (e.g., whether the object is shared among multiple threads or is local to a single thread) within the shape of the object, thus facilitating quick identification of the sharing status of an object. That is, shared objects and thread-local objects have different shapes. A low-overhead synchronization mechanism may be used to synchronize writes to an object, where the synchronization mechanism is not triggered until multiple concurrent threads execute. There is no additional overhead for single-threaded programs. For example, shared objects may not be tracked until a second concurrent thread executes, at which point an object may "escape" from one thread and become reachable by another thread. When a thread seeks to write to or read from a local object, the read or write may proceed without requiring synchronization. Reading from a shared object requires no synchronization other than accessing the shape of the object prior to accessing the object's contents.

An object that is local to a single thread may become shared when it becomes reachable via (i.e., stored in) an already-shared object. Object reachability may be tracked efficiently using the object representation, and may be optimized using knowledge about the run-time object graph to reduce the operations necessary for marking objects as shared between multiple threads. Safety may be provided by an object storage model that places each field/type pair in a separate, non-reusable storage location. Preventing reuse of storage locations avoids errors (e.g., lost field definitions, lost field updates, out-of-thin-air field values) arising from race conditions between a thread concurrently performing an update with other threads performing unsynchronized reads (which may be unsynchronized to improve performance). Metadata included in the object shape may speculate about the structure of the dynamic object at run-time, and for allocating storage for the object based on that speculation. Runtime shape checks are typically required to check whether the optimistic assumption regarding the shape of an object matches the actual runtime shape of the object. A sharing code tree cache that stores specialized shape checks may be used to improve the performance of shape checks (e.g., using pointer comparisons) and object sharing.

FIG. 1 shows a system in accordance with one or more embodiments of the invention. As shown in FIG. 1, the system includes a computer system (100) that includes a program (102) and a runtime system (106). In one or more embodiments, the computer system (100) may be the computing system (700) described with respect to FIG. 7A and the accompanying description below, or may be the client device (726) described with respect to FIG. 7B.

In one or more embodiments, a program (102) is a sequence of instructions written to perform one or more operations. In one or more embodiments of the invention, the program (102) includes operations that act on one or more objects (104a-104z). The program (102) may be written in a programming language, which is a syntactic and semantic method of expression for communicating the program's instructions to a computing device (e.g., computer system (100)). In one or more embodiments, the programming language may be a dynamic language that does not require static type information to be associated with objects (104a-104z), and permits fields to be dynamically added to and removed from objects (104a-104z). The absence of static type information may result in the type of an object (104a-104z) being unknown at runtime, potentially resulting in significant runtime type-checking overhead.

In one or more embodiments, an object (104a-104z) is a representation of data (e.g., numbers, strings, arrays, functions, etc.) via a collection of fields, such as data attributes, and associated methods, such as routines and procedures to manipulate properties. In one or more embodiments of the invention, object fields may include references to other objects (104a-104z).

Continuing with FIG. 1, in one or more embodiments of the invention, the runtime system (106) may include threads (107t-107w), object storage (108), shapes (120), and a sharing code tree cache (140). The runtime system (106) may execute the program (102) and provide various support services during program execution, including type-checking, code generation and/or optimization, managing object storage (108) in memory (e.g., non-persistent storage (704) and/or persistent storage (706) of FIG. 7A), and synchronizing access to objects (104a-104z) by threads (107t-107w). The runtime system (106) may be operatively connected to an interpreter (not shown) and a compiler (not shown).

Figure 7A:
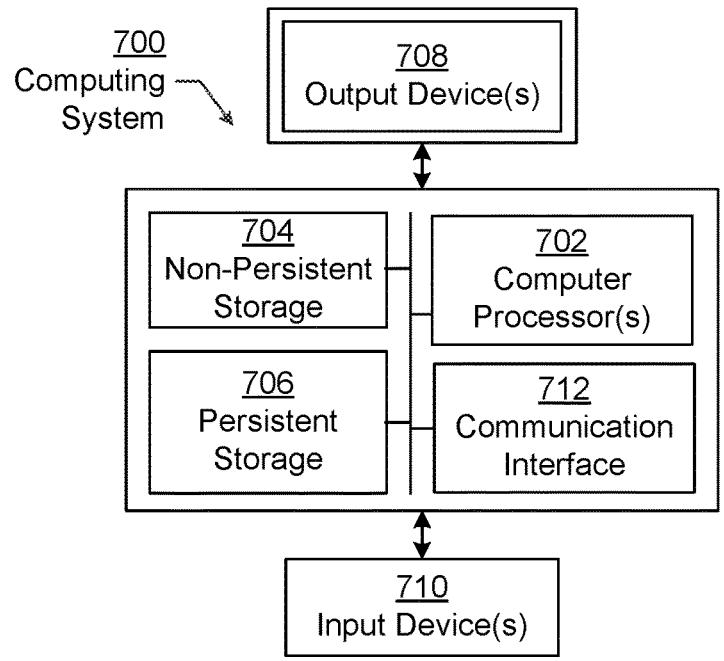
FIG. 7A and FIG. 7B show computing systems in accordance with one or more embodiments of the invention.

A thread (107t-107w) is a logically separate (i.e., isolated) instruction execution stream in which tasks and/or transactions may be executed by a processor (e.g., computer processor(s) (702) of FIG. 7A)). In one or more embodiments of the invention, a computing device with more than one processor may include one or more threads (107t-107w) per processor.

In one or more embodiments of the invention, the program (102) is designed to be executed in a virtual machine. A virtual machine is a software implementation of a computing device executing on an underlying computing device (e.g., computer system (100)). A virtual machine may abstract the operating system and hardware of the underlying computing device from instructions (e.g., instructions of program (102)) that are executed in the virtual machine.

In one or more embodiments of the invention, the runtime system (106) may include a compiler operatively connected to an interpreter. The compiler may be a computer program designed to transform source code written in a programming language, or intermediate representation of a program, into machine code that is capable of being executed in a virtual machine. In one or more embodiments of the invention, the compiler includes functionality to translate an intermediate representation of the program into machine code that the virtual machine is configured to execute. For example, the compiler may include functionality to create machine code that, when executed in lieu of direct execution of an intermediate representation of the program, improves the execution speed of the program (102). In one or more embodiments of the invention, the compiler includes functionality to perform compilation of operations or functions as the program is executing (e.g., just-in-time (JIT) compilation).

Continuing with FIG. 1, in one or more embodiments of the invention, object storage (108) stores, in a memory of the computer system (100), the runtime representations of objects (104a-104z) of the program (102). With dynamically-typed programming languages, the precise storage requirements of an object (104a-104z) may be unknown at runtime since the type of the object (104a-104z) may be unknown at runtime. In one or more embodiments of the invention, in order to accommodate objects (104a-104z) of arbitrary and unknown size, object storage (108) is divided into fixed storage (110) and extended storage (112). The fixed storage (110) may accommodate a fixed number of fields (114a). The extended storage (112) may accommodate, if needed, an arbitrary number of additional fields (114n), for example, in an extension array. Both the fixed storage (110) and the extended storage (112) include values (116a-116n) corresponding to the fields (114a-114n) of the object (104a-104z), where each value (116a-116n) may have an associated type (118a-118n). The type (118a-118n) defines the possible values (116a-116n) a field (114a-114n) may have (e.g., integer, string, array, Boolean, etc.). In one or more embodiments, the type (118a-118n) may be a primitive type or a reference type. In one or more embodiments values (116a-116n) corresponding to a primitive type may not be accessible via references (e.g., the Java Virtual Machine imposes a strict distinction between primitive and reference types).

In one or more embodiments, each storage location is non-reusable, in order to avoid the adverse impact of race conditions due to the activities of multiple threads (107t-107w). For example, non-reusable storage locations prevent "out-of-thin-air" values, or values that are not derived from a defined initial state or previous update to a field (114a-114n). Out-of-thin-air values, in some unsafe object representations, are values that are not derived from a defined initial state or previous field update. For example, out-of-thin-air values may occur if a memory location is reused for storing another field value. For instance, if a field is removed and its storage location is reused or if there are concurrent field definitions which both use the same storage. When both fields are assigned the same memory location, it is possible that the second field value is written first, then the first field update completes (updating the value and the shape), and then the second field update assigns the new shape. Any reader of the second field will now read a value which was assigned to the first field. Preventing out-of-thin-air values may require correct synchronization to avoid unsafe race conditions for data races that either are not in the original program, or are non-obvious and implementation dependent.

In one or more embodiments, each storage location may uniquely correspond to a single field (114a-114n). That is, a storage location, once assigned to a field (114a-114n), may not be used to store a value (116a-116n) for another field (114a-114n). Furthermore, in one or more embodiments, when a value (116a-116n) of a field (114a-114n) is modified, and the modified value (116a-116n) has a different type (118a-118n) from the previous value (116a-116n) of the field (114a-114n), then a new storage location is used to store the new value (116a-116n) of the field (114a-114n). In other words, in one or more embodiments, each storage location uniquely corresponds to a combination of a field (114a-114n) and a type (118a-118n). By ensuring that storage locations (122a-122n) are used only for a single pair of field (114a-114n) and type (118a-118n), a read may only see values (116a-116n) related to that field (114a-114n) and type (118a-118n), and therefore cannot misinterpret the value (116a-116n) as the wrong type (118a-118n). For example, if a stale shape (120) is used (e.g., because another thread (107t-107w) is in the process of modifying the shape (120)), a new or modified field description might not yet be present in the shape (120), and an attempt to access the new or modified field (114a-114n) may generate "absent field" semantics, which provides a measure of safety, since out-of-thin-air values would be prevented.

Continuing with FIG. 1, in one or more embodiments of the invention, each object (104a-104z) has a corresponding shape (120) that represents information about the run-time state of the object (104a-104z), as manifested in the corresponding object storage (108). A shape (120) may be thought of as a "hidden class" of the corresponding object (104a-104z).

In one or more embodiments, the shape (120) maps each field (114a-114n) of the object (104a-104z) to a storage location (122a-122n). The storage location (122a-122n) may be a location in object storage (108) (e.g., in fixed storage (110) or extended storage (112)). In one or more embodiments of the invention, the mapping of fields (114a-114n) to storage locations (122a-122n) may be updated when additional storage is allocated for a field (114a-114n). In one or more embodiments, the mapping of the shape (120) may be updated to include the correspondence of a modified field (114a-114n) to a new storage location (122a-122n) allocated in object storage (108). For example, a new storage location (122a-122n) may be allocated in object storage (108) corresponding to an existing field (114a-114n) that contains a new value (116a-116n) whose type (118a-118n) is different from the type (118a-118n) of the previous value (116a-116n).

In one or more embodiments, the layout of object storage (108) may be based on metadata (124a-124n) (e.g., tracked by the runtime system (106)) regarding how objects (104a-104z) with the same or a similar shape (120) have been previously used by the program (102). The layout of object storage (108) may therefore be optimistic, and accessing an object (104a-104z) may require a check to determine whether the actual structure of the object (104a-104z) at run-time conforms to the optimistic layout of the corresponding object storage (108).

If the check determines that the optimistic speculation regarding the object structure is correct, then read or write instructions may be performed directly and efficiently on the object (104a-104z) using the shape metadata (124a-124n) and storage locations (122a-122n) corresponding to the fields (114a-114n) in the corresponding object storage (108) (e.g., in the fixed storage (110) and the extended storage (112)).

Metadata (124a-124n) may contain information about the type(s) (118a-118n) of the value(s) (116a-116n) of each field (114a-114n) for objects (104a-104z) assigned a specific shape (120). Metadata (124a-124n) may be based on patterns (e.g., observed by the runtime system (106)) in previous values (116a-116n) of a field (114a-114n).

In one or more embodiments, the shape (120) may include a sharing status (130). The sharing status (130) may indicate whether the corresponding object (104a-104z) is local to a single thread (107t-107w), or may be shared among multiple threads (107t-107w). In one or more embodiments, when a single thread (107t-107w) is executing for a program (102), the objects (104a-104z) created by the thread (107t-107w) are assigned shapes (120) with a sharing status (130) of "local".

Embedding the sharing status (130) within the shape (120) facilitates quick identification of the sharing status of an object. In one or more embodiments, this enables a shape check to not only check the structure of an object (104a-104z), but also check whether the object (104a-104z) is shared or local. Therefore, shape checks may be used to automatically select a course of action without requiring an additional test to determine whether an object (104a-104z) is local to a thread (107t-107w) or shared among multiple threads (107t-107w). In addition, shape checks may be reused, since shape checks may already be performed when accessing objects (104a-104z) (e.g., to verify that the object (104a-104z) actually conforms to a predicted shape (120) at run-time).

In one or more embodiments, the sharing status (130) may indicate a value other than "local" or "shared". For example, the sharing status (130) may indicate a conditional sharing status that depends on one or more contextual factors pertaining to the state of the executing program (102) and/or one or more of its threads (107t-107w).

Initially, globally accessible objects (104a-104z) may be marked as shared (e.g., by setting their sharing status (130) to be "shared"). The set of initially shared objects (104a-104z) may be language-specific, but typically includes classes, constants, and generally data structures that are accessible by all threads (107t-107w). For example, in Java, the initial set may also include objects (104a-104z) stored in static fields, and in Ruby it may also include objects (104a-104z) stored in global variables.

In one or more embodiments of the invention, an underlying issue is that object shape (120) and extended storage (112) cannot be updated atomically, because this would require full synchronization on each object (104a-104z) access, which may negatively impact performance. As a consequence, a read from an object (104a-104z) may see a shape (120) that is newer than what the object storage (108) represents, or see object storage (108) newer than what the shape (120) describes. For example, this can happen either because an update might still be underway in another thread (107t-107w) or because there are memory re-orderings, performed by a compiler or CPU.

By ensuring that storage locations are only used for a single pair of field (114a-114n) and type (118a-118n), it may be guaranteed that a read operation sees either the newest value, a default value, or a stale value, but not an undefined value. In case a stale shape (120) is used, the field (114a-114n) itself may not yet be visible, which is an acceptable outcome. In case the shape (120) is already updated, but the storage update is not yet visible, it may be possible to access a field (114a-114n) that is defined in the new shape (120) but without a corresponding location in object storage (108). To account for this case, in one or more embodiments of the invention, object storage (108) grows monotonically and is allocated precisely for a specific shape (120). In such embodiments, access to a location that does not exist in object storage (108) results in out-of-bounds error, which may be handled efficiently by a programming language using the semantics of an absent field.

The monotonic storage allocation strategy may also have consequences for removed fields (114a-114n). In one or more embodiments, the extended storage (112) may not shrink and the location of the removed field (114a-114n) may not be reused. Therefore, the field (114a-114n) may be marked as "removed" in the corresponding shape (120). A dynamically-typed language's field lookup routine may then see that the field (114a-114n) is no longer available for objects (104a-104z) of the corresponding specific shape (120).

In one or more embodiments, when a field (114a-114n) is removed, new storage is allocated for the object (104a-104z), and a new shape (120) is created, identical to the previous shape (120), except that the removed field (114a-114n) is marked as removed. The removed field (114a-114n) may be retained in the shape (120) in order to preserve a monotonicity property of object storage (108), such that object storage (108) grows over time, where new fields (114a-114n) are added in object storage (108) beyond the storage of all existing fields (114a-114n). For example, the monotonicity property would not be preserved if new fields (114a-114n) reused the object storage (108) corresponding to removed fields (114a-114n). An advantage of monotonically growing storage is that a reference to a non-existent field (114a-114n) (i.e., a field (114a-114n) defined in the shape (120), but not yet present in object storage (108), for example, due to race conditions among threads (107t-107w)) will generate an out-of-bounds error. That is, an out-of-bounds error provides safety, and is preferable to the alternative: inadvertently accessing an out-of-thin-air value of stale contents in object storage (108) corresponding to a removed field (114a-114n). Alternatively, in one or more embodiments, the monotonicity requirement may be modified, for example, such that for a globally safe point of program execution, object storage (108) may be compacted (e.g., to remove holes, or discontinuities in object storage (108) in order to reduce the memory footprint of an object) when a field (114a-114n) is removed.

Continuing with FIG. 1, in one or more embodiments of the invention, the runtime system (106) may include functionality to synchronize writing to a field (114a-114n) by locking the corresponding object (104a-104z) in order to prevent lost field definitions, lost updates, and/or other problems arising from concurrent updates to an object (104a-104z) by multiple threads (107t-107w). Synchronization may be used for objects (104a-104z) that are shared between multiple threads (107t-107w). Synchronization may be omitted when an object (104a-104z) is local to a single thread (107t-107w).

Lost field definitions, in some unsafe object representations, may occur when concurrent updates of field definitions for an object can lead to only one of the fields being added. Such a problem may appear when two threads simultaneously start to derive a new shape from an object's original shape (e.g., where access to the shape pointer is unsynchronized to avoid interfering with compiler optimizations). Thus, each thread will add its field to a separate new shape, and then update the object's shape pointer without synchronization, which means that the shape that was written first into the object is lost.

Lost field updates, in some unsafe object representations, may occur when the storage allocated to a given object needs to grow to accommodate new fields. Generally, objects may have an unbounded number of fields, which is common, for example, in script languages, where objects are also used directly as hash tables. Using a fixed memory representation thus requires a mechanism to extend the storage used for an object. Assuming a state-of-the-art allocator, objects cannot be grown in-place, because they are allocated consecutively with only minimal fragmentation. Thus, an object may not be grown directly. Instead, an extension array allocated in storage for the object may be replaced by a new array. The replacement of the extension array with a new array may cause updates on the old array to be lost, because the updates are racing with the copying to the new array and setting the extension array reference.

Continuing with FIG. 1, in one or more embodiments of the invention, the runtime system (106) may include functionality to speculate about a shape (120) of an object (104a-104z), and/or to speculate about a type (118a-118n) of a value (116a-116n) of a field (114a-114n) of an object (104a-104z)). For example, the speculation may be based on an analysis of metadata (124a-124n) corresponding to a field (114a-114n) of objects (104a-104z) with a common or similar shape (120). Based on the speculation, the runtime system (106) may modify operations and/or deoptimize the operations in the event that the speculation fails. Speculation is a technique in which the program execution system makes assumptions (i.e., speculates) about some aspect of the program execution and performs modifications intended to alter some aspect of program execution (e.g., execution speed). In one or more embodiments of the invention, the runtime system (106) may include functionality to, during program execution, keep record of various aspects of program execution, and to modify portions of the program based on the data collected (e.g., metadata (124a-124n) included in the shape (120) of an object (104a-104z)). For example, the runtime system (106) may generate and/or modify a sharing code tree cache (140) corresponding to a program (102) to include compiled (e.g., optimized) machine code rather than an abstract syntax tree (AST) node for an operation that the runtime system (106) has determined, based on the recorded data about program execution, may be executed more efficiently via compilation than by interpretation. In one or more embodiments of the invention, the runtime system (106) may include functionality to, in the event that the speculation is incorrect, undo (i.e., deoptimize) previously made modifications of operations and execute unmodified or differently modified operations instead.

The runtime system (106) may include functionality to determine a graph of objects (104a-104z) that are reachable starting from a specific "root" object (104a-104z). That is, there may be a succession of references starting with the fields (114a-114n) of the root object (104a-104z) to the "child" objects (104a-104z) referenced by the root object (104a-104z), and then to the "grandchild" objects (104a-104z) referenced by the child objects (104a-104z), etc.

When multithreaded execution of a program (102) is detected, objects (104a-104z) that are reachable by multiple threads (107t-107w) may be marked as shared by assigning each of the reachable objects (104a-104z) a new shared shape (120) (that is, unless the reachable object (104a-104z) is already shared, in which case its current shape (120) may be retained). Determining the set of reachable objects (104a-104z) by traversing the inter-object references in the object graph and marking objects (104a-104z) as shared (by assigning a shared shape (120) to those objects) is a useful optimization that avoids tracking the exact set of objects (104a-104z) concurrently accessed by multiple threads (107t-107w), which may require a read barrier or extra metadata per object (104a-104z).

The runtime system (106) may include functionality to share the set of objects (104a-104z) that are reachable from a specific object (104a-104z). That is, once a local object (104a-104z) becomes shared, its assigned shape (120) may be changed to a shared variant which indicates that the object (104a-104z) it represents may be shared among multiple threads (107t-107w). In one or more embodiments, when a value (116a-116n) that references a local object (104a-104z) is written to a field (114a-114n) of a shared object (104a-104z), that local object (104a-104z) may then be shared, and be assigned a shared shape (120), because that "local" object (104a-104z) has now become globally reachable as well, via the already-shared object (104a-104z).

For example, when a reference to a local object O (104a-104z) (i.e., an object whose sharing status (130) is "local", that is, non-shared) is stored within a shared object P (104a-104z) (i.e., an object whose sharing status (130) is "shared"), the sharing status (130) of object O (104a-104z) may be modified to be "shared", since object O (104a-104z) may now be shared simply by accessing a field (114a-114n) of the shared object P (104a-104z). In order to avoid any potentially adverse consequences of race conditions among multiple threads (107t-107w), prior to storing the reference to object O (104a-104z) within the field (114a-114n) of object P (104a-104z), a new shared shape (120) may be assigned to object O (104a-104z) indicating that the sharing status (130) of object O is now "shared", so that object O (104a-104z) may be instantly shareable once it is stored in object P (104a-104z).

In one or more embodiments, as discussed above, determining and sharing all reachable objects (104a-104z) from a root object (104a-104z) requires traversing the object graph (e.g., by tracing inter-object references) beginning with the root object (104a-104z). Traversing the object graph may incur a substantial run-time overhead. In one or more embodiments of the invention, optimistic speculations about recently used shapes (120) may be stored in a sharing code tree cache (140) that mirrors the structure of the object graph starting from a value (116a-116n) (e.g., a value that references a local object (104a-104z)) to be stored into a field (114a-114n) of a shared object (104a-104z).

In one or more embodiments, the purpose of the sharing code tree cache (140) is to improve the performance of structurally checking an object graph, by caching a specialized object graph that may be quickly compared to an object graph corresponding to a set of reachable objects (104a-104z). If the speculation turns out to be false, then the optimized code in the sharing code tree cache (140) may be bypassed and a comprehensive, deoptimized shape checking analysis may be performed instead. The optimization may be applied transitively, optionally using a depth limit to avoid traversing large object graphs. The sharing code tree cache (140) may function as part of the program execution, where the nodes (142a-142g) of the sharing code tree cache (140) may be abstract syntax tree (AST) nodes (e.g., that may be compiled to machine code) that actually implement the sharing of objects (104a-104z). That is, sharing a root object (104a-104z) using a sharing code tree cache (140) includes checking that the local shapes (120) of the objects (104a-104z) reachable from the root object (104a-104z) match their corresponding local shapes (120), and then assigning new shapes (120) to the reachable objects (104a-104z), where the new shapes (120) are shared variants of the corresponding local shapes (120).

Figure 6A:
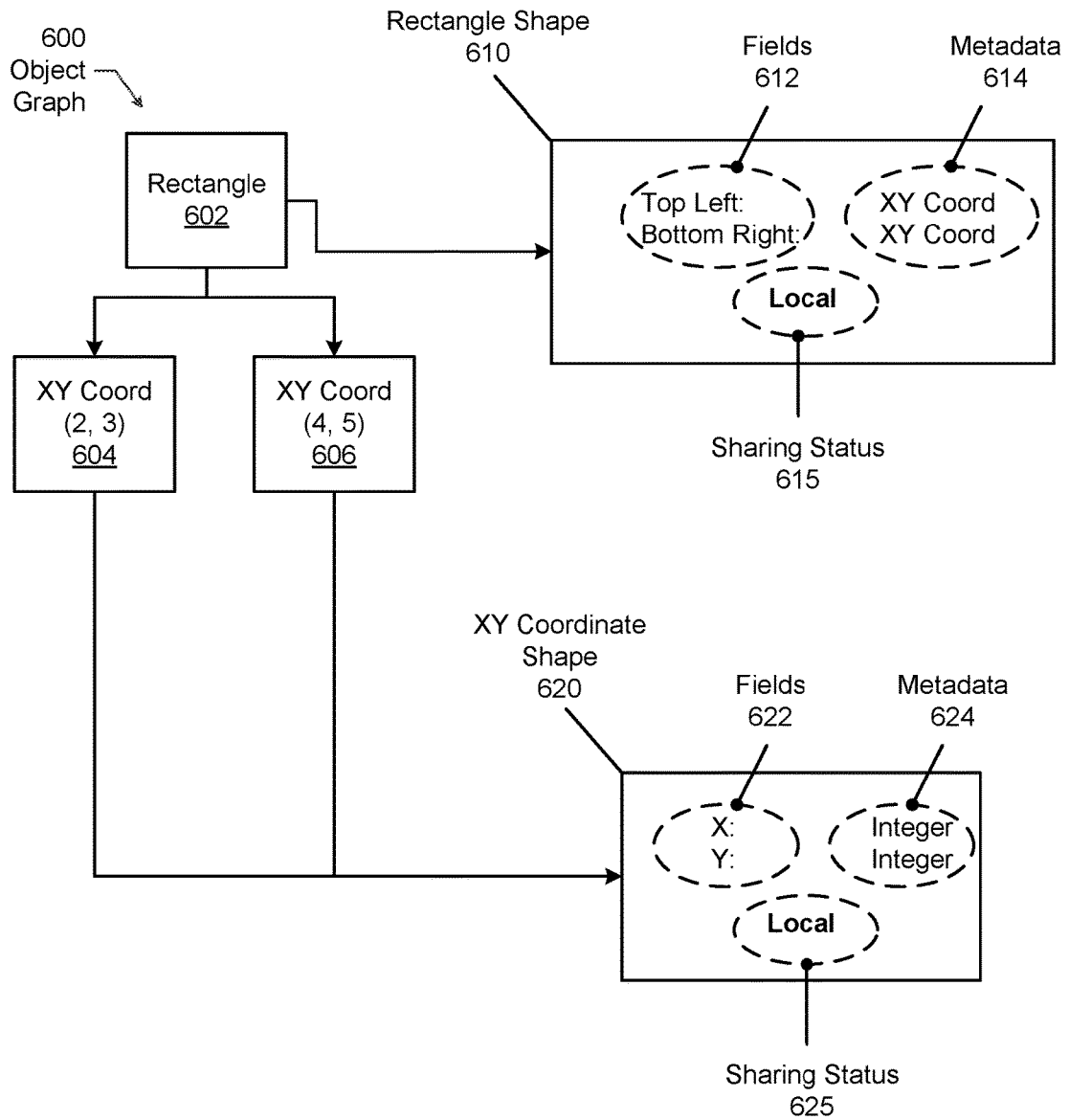
FIG. 6A, FIG. 6B, FIG. 6C, and FIG. 6D show examples in accordance with one or more embodiments of the invention.

In one or more embodiments, the nodes (142a-142g) of the sharing code tree cache (140) may perform specialized shape checks and propagate sharing through the set of objects (104a-104z) reachable from a root object (104a-104z). The sharing code tree cache (140) may be used, and reused, by multiple threads (107t-107w) to quickly and efficiently share a small object graph (i.e., unless the speculations embedded in the sharing code tree cache (140) fail to match the actual objects (104a-104z) to be shared). Sharing a set of reachable objects (104a-104z) is illustrated in FIG. 6D.

The above optimization may therefore perform a focused analysis to determine whether a small object graph matches a previously seen structure with just a few shape checks and field reads. Furthermore, it minimizes the overhead of sharing the reachable objects (104a-104z) in an object graph to just changing the shapes (120) of a few reachable objects (104a-104z). In contrast, computing and sharing the set of all reachable objects (104a-104z) by analyzing a global object graph (e.g., constructed using the complete set of inter-object references) may incur a substantial runtime performance overhead.

The runtime system (106) may include functionality to, once program execution becomes multithreaded, implement a write barrier, or a particular ordering of writes to objects (104a-104z), when a field (114a-114n) of a shared object (104a-104z) is updated. Implementing the write barrier may include locking a shared object (104a-104z) while the corresponding object storage (108) is being updated. The particular ordering of writes to objects (104a-104z) may include first sharing the value (116a-116n) to be updated, and then assigning the value (116a-116n) in object storage (108). Implementing the write barrier may be based on the type (118a-118n) of the value (116a-116n) as well as its shape (120), if the value (116a-116n) is an object (104a-104z). If the value (116a-116n) is a primitive type, then the value (116a-116n) does not have fields and cannot reference other objects, so the value (116a-116n) does not need to be shared. If the value (116a-116n) is an object (104a-104z), its shape (120) may be changed to a shared variant of its local shape (120) (i.e., unless the object (104a-104z) already has a shared shape (120)). The type (118a-118n) and shape (120) of a value (116a-116n) may be expected to be stable at a certain point in the program (102), as the value (116a-116n) is assigned to a specific field (114a-114n), where reading from that field (114a-114n) is typically based on specific expectations regarding its type (118a-118n).

While FIG. 1 shows a configuration of components, other configurations may be used without departing from the scope of the invention. For example, various components may be combined to create a single component. As another example, the functionality performed by a single component may be performed by two or more components.

Figure 2:
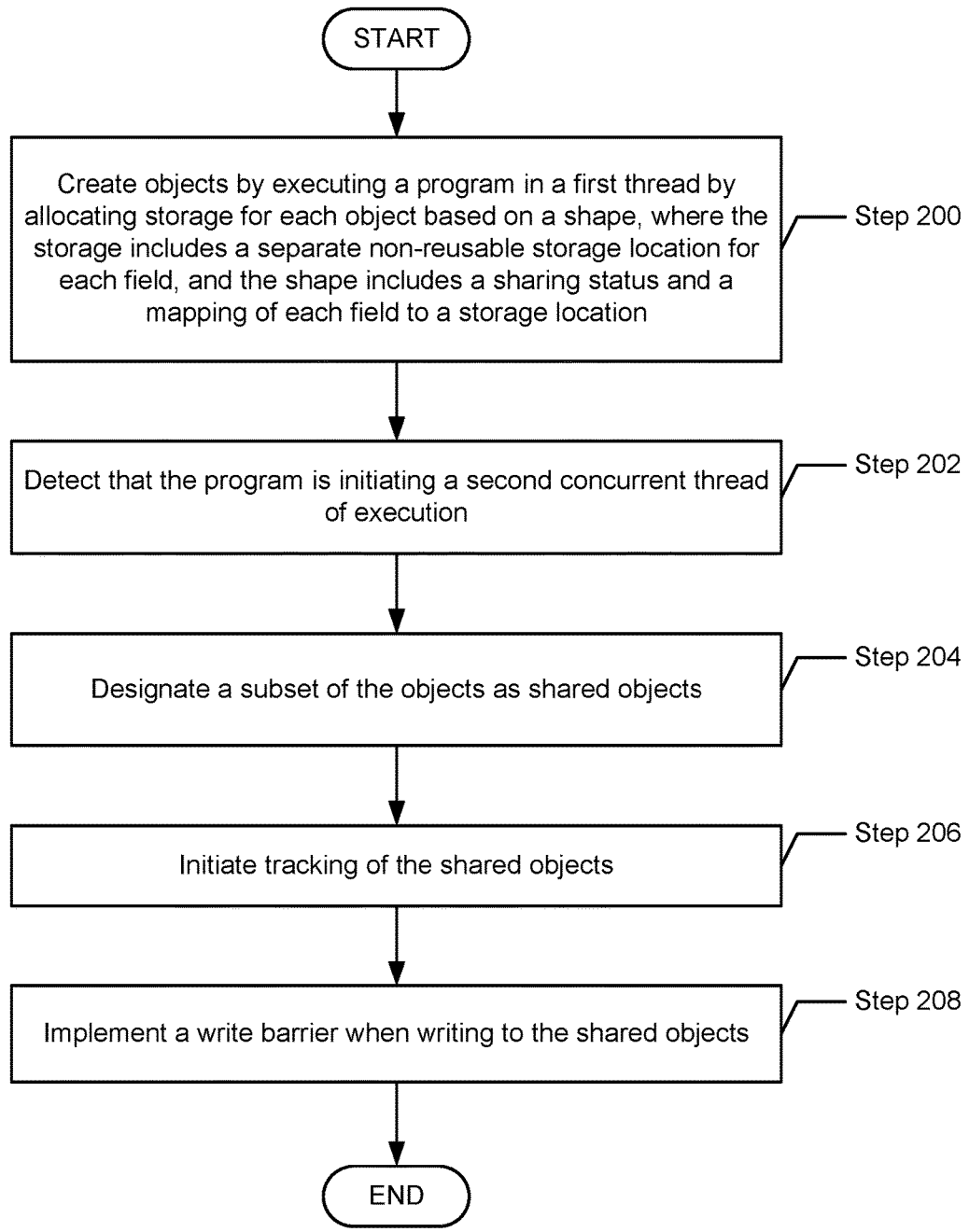
FIG. 2 and FIG. 3 show flowcharts in accordance with one or more embodiments of the invention.

FIG. 2 shows a flowchart in accordance with one or more embodiments of the invention. The flowchart depicts a process for implementing efficient, thread-safe dynamic objects. One or more of the steps in FIG. 2 may be performed by the components of the computer system (100), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, objects are created by executing a program in a first thread by allocating storage for each object based on a shape. The storage may include a separate, non-reusable storage location for each field of the object. The shape may include a sharing status and a mapping of each field to a storage location. In one or more embodiments, the program may be written in a dynamically-typed programming language that does not require static type information to be associated with objects, and permits fields to be dynamically added to and removed from objects (i.e., dynamic reshaping of objects).

In one or more embodiments, to guarantee safe reads from object fields without requiring synchronization of all reads, object storage is configured to use separate, non-reusable storage locations for each combination of object field and type. Such embodiments of the invention may ensure that a data race between updating an object's shape and its storage locations may not cause out-of-thin-air values, lost field definitions, or lost field updates. In one or more embodiments of the invention, object storage is implemented to specialize fields based on types, and represents an arbitrary number of fields by combining fixed storage accommodating a fixed number of fields and extended storage (e.g., in an array) for additional fields. In one or more embodiments, the shape maps each field of the object to a storage location in object storage (e.g., in fixed storage or extended storage).

In one or more embodiments, the sharing status of the shape indicates whether the corresponding object is local to a single thread or may be reachable by multiple threads. In one or more embodiments, when a single thread is executing for a program, the objects created by the thread are assigned shapes with a sharing status of "local". Synchronization of object accesses may be unnecessary for objects marked as local.

In Step 202, initiation of a second concurrent thread of execution of the program is detected. In one or more embodiments, the initiation of the second thread acts as a trigger for the implementation of thread-safe objects for multi-threaded execution. In one or more embodiments, thread-safe objects are unnecessary for single-threaded execution.

In Step 204, a subset of the objects is designated as shared objects. In one or more embodiments, designating the shared objects involves setting the sharing status of the shape assigned to each shared object to indicate that the object is shared. In one or more embodiments, setting the sharing status of the shape may be implemented by assigning a new shape to the object with a sharing status of "shared". In one or more embodiments, identification of shared objects starts with identification of globally-reachable objects. The set of globally-reachable objects may be language-specific, but typically includes classes, constants, and data structures that are accessible by all threads.

In Step 206, tracking of the shared objects is initiated. In one or more embodiments, objects that become reachable from the initial set of shared objects may be tracked (e.g., by a runtime system of the computer system) by marking the reachable objects as shared, for example, by assigning the reachable objects a shape that indicates that the reachable object has a sharing status of "shared".

In Step 208, a write barrier when writing to the shared objects is implemented. In one or more embodiments, a shared object may not be written until any objects written (e.g., by storing a reference) to the fields of the shared object are first shared (e.g., if the object is not already shared), to prevent problems arising from race conditions among threads. If a value written to a field of the shared object is a primitive type, then the value does not have fields and cannot reference other objects, so the value may not need to be shared. If the value is an object with a local shape, it may be assigned a new, shared shape that is a variant of its local shape, with the same fields and types as the local shape, but with a sharing status of "shared". In one or more embodiments, synchronization of writes to shared objects (e.g., including writes to fields of shared objects) may be implemented by locking the corresponding object for the duration of the write, in order to sequentialize writes and prevent lost field definitions and updates.

It may be generally assumed that to provide good performance, multithreaded programs tend to minimize the mutation of shared state in order to avoid sequential bottlenecks. Therefore, writing to shared objects is expected to be relatively rare, and adding a synchronization overhead for writes is a good tradeoff between safety and performance. The thread-safe dynamic object model incurs no overhead on peak performance for objects local to a thread, and only 3% average overhead on tested parallel benchmarks where field updates require synchronization. Thus, it can be a foundation for safe and efficient multithreaded virtual machines for a wide range of dynamic languages.

Figure 3:
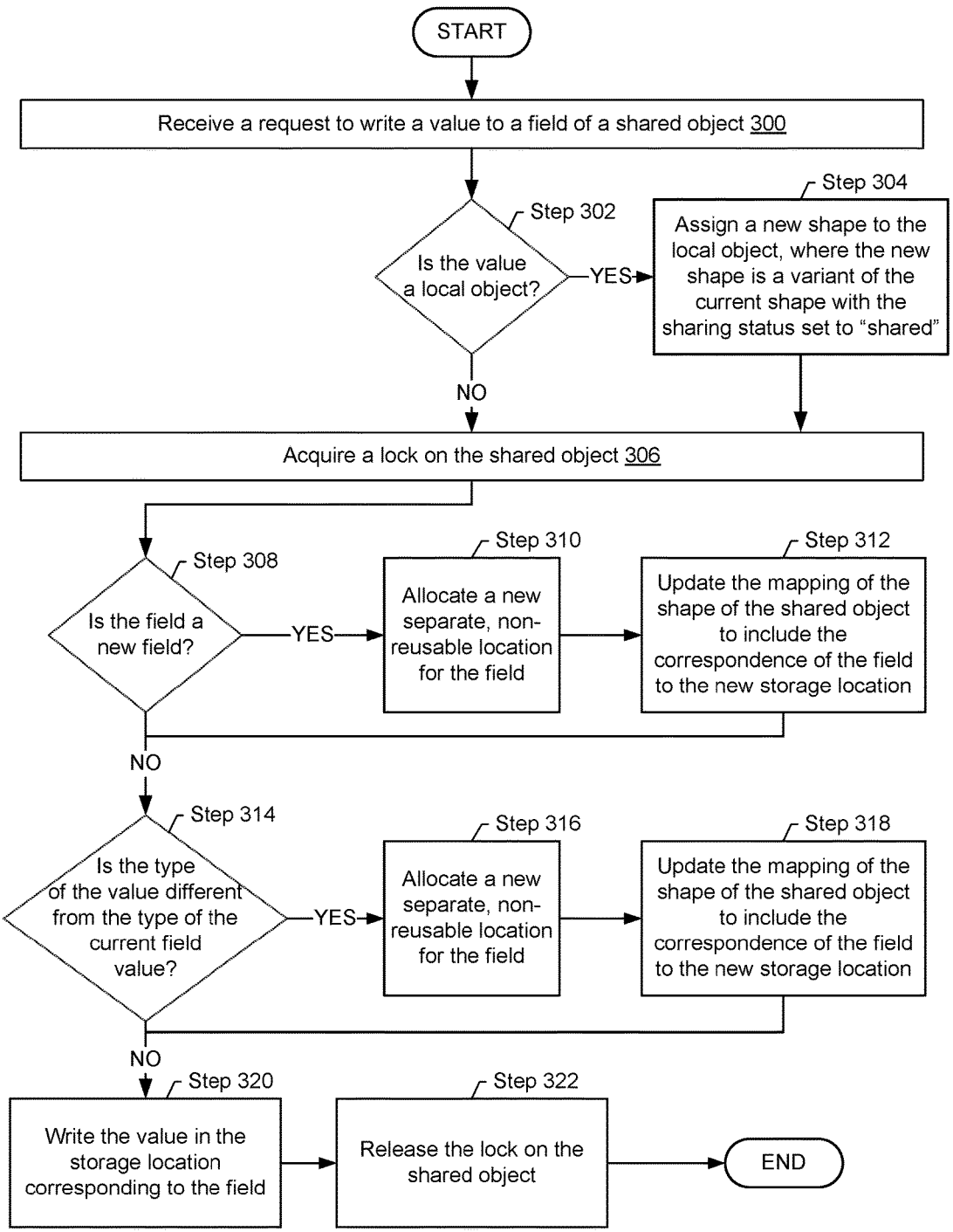

FIG. 3 shows a flowchart in accordance with one or more embodiments of the invention. The flowchart depicts a process for a write operation. One or more of the steps in FIG. 3 may be performed by the components of the computer system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a request is received to write a value to a field of a shared object. In one or more embodiments of the invention, the request may be received from any entity. For example, the dynamically-typed language program may reach a point in execution requiring a write to a shared object. As another example, a user of a program written in a dynamically-typed language may perform an action that requires a write to a shared object. In one or more embodiments of the invention, the object to be written to is identified as a shared object based on the shape of the object. In one or more embodiments of the invention, if an object becomes reachable from other threads, a write operation to the object may, before beginning performance of the write, perform a check to determine whether the object is marked as a shared object (e.g., via the shape of the object). If the object is not marked as shared, then the write operation may mark the object as shared.

If, in Step 302, it is determined that the value is a local (i.e., non-shared) object, then Step 304 below is performed. In one or more embodiments, determining whether an object is local or shared may be performed by examining the sharing status of the shape assigned to the object.

In Step 304, a new, shared shape is assigned to the local object, where the new shape is a variant of the current shape assigned to the local object with the sharing status set to "shared". That is, the new, shared shape may have the same fields and types as the current shape, where the only difference between the current shape and the new, shared shape is the difference in sharing status.

Figure 4:
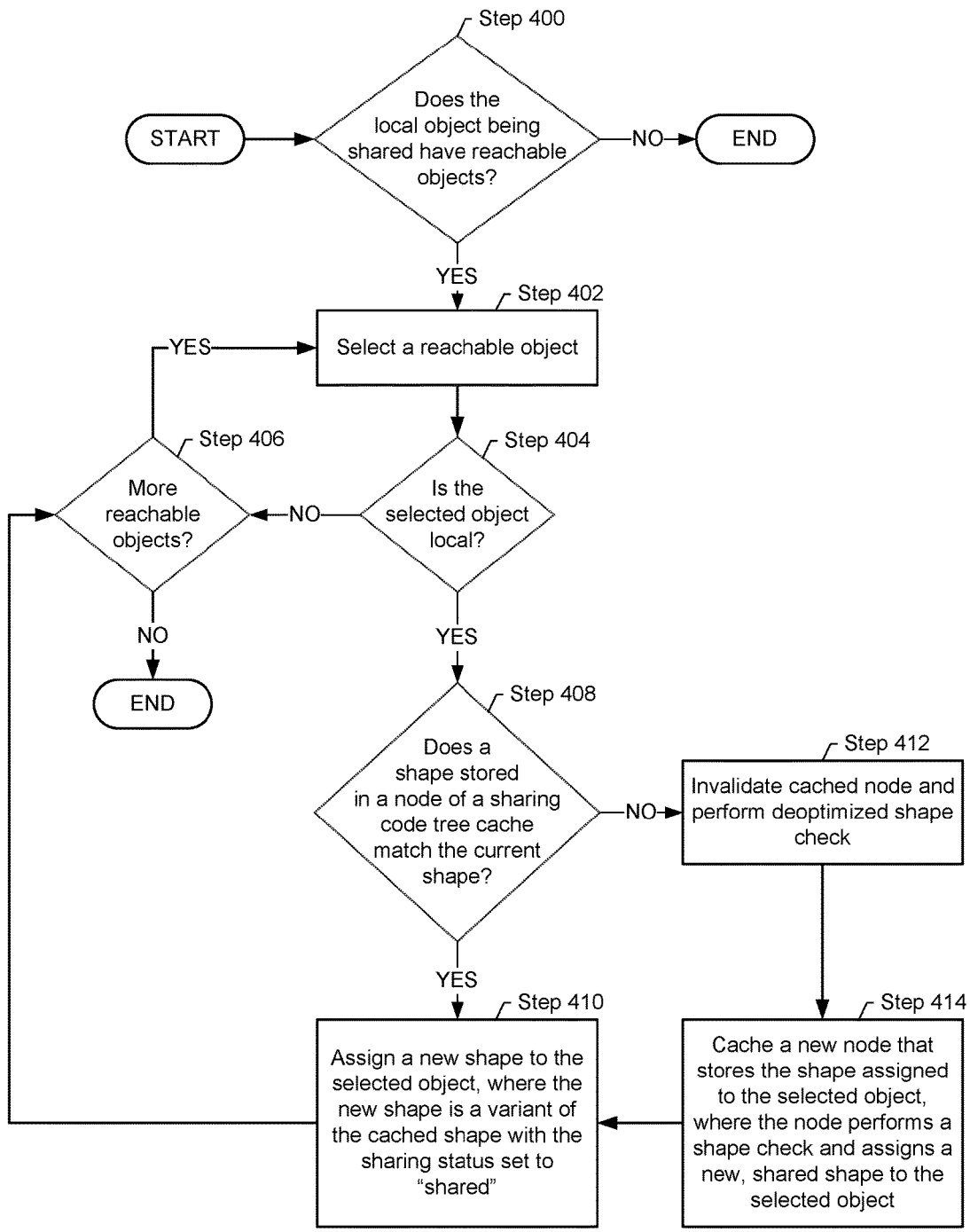
FIG. 4 and FIG. 5 show flowcharts in accordance with one or more embodiments of the invention.

In one or more embodiments, if there are additional objects reachable from the local object, then these reachable objects may be shared as well, recursively, after the local object is assigned a shape, as shown in FIG. 4 and discussed below.

In Step 306, a lock is acquired on the shared object. In one or more embodiments of the invention, a lock may be any method for preventing any other thread from accessing an object during the write. For example, the lock may include functionality to prevent any writes to any fields of the shared object.

If, in Step 308, it is determined that the field is a new field being added to the shared object, then in Step 310, a new separate, non-reusable storage location is allocated for the field in the object storage corresponding to the shared object. As discussed above with respect to Step 200, in one or more embodiments of the invention, the use of a new separate, non-reusable storage location for each field and type combination may ensure that the write does not cause out-of-thin-air values, lost field definitions, or lost field updates. In one or more embodiments, the new storage location may be stored in the fixed storage of the shared object. In one or more embodiments, the new storage location may be stored in the extended storage of the shared object (e.g., if there is no more space in the fixed storage).

In Step 312, the shape corresponding to the shared object is updated to include the correspondence between the field and the new storage location in the shape's mapping of fields to storage locations.

If, in Step 314, it is determined that the type of the value is different from the type of the current field value, then in Step 316, a new separate, non-reusable storage location is allocated for the field in the object storage (e.g., in fixed storage or extended storage) corresponding to the shared object, as described in Step 310 above. As described above in Step 200, object storage may be configured to use separate, non-reusable storage locations for each combination of object field and type (e.g., unless the type is a primitive value that cannot be shared).

In Step 318, the shape corresponding to the shared object is updated to include the correspondence between the field and the new storage location in the shape's mapping of fields to storage locations, as described in Step 312 above.

In Step 320, the value is written to the storage location corresponding to the field.

In Step 322, the lock acquired in Step 306 is released, now that the write operation is completed, enabling the local object to be recognized as shareable.

FIG. 4 shows a flowchart in accordance with one or more embodiments of the invention. The flowchart depicts a process for sharing objects. Moreover, the flowchart in FIG. 4 may correspond to Step 304 in FIG. 3. One or more of the steps in FIG. 4 may be performed by the components of the computer system (100), discussed above in reference to FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, if, in Step 400, it is determined that the local object being shared (e.g., in Step 304 above), has reachable objects, then in Step 402, a reachable object is selected. The determination may be based on traversing an object graph that begins with the local object being shared, and noting any references to local objects encountered during the traversal of the object graph. In one or more embodiments, the object graph may be traversed in a depth-first manner. In one or more embodiments, the object graph may be traversed in a breadth-first manner. In one or more embodiments, the object graph may be traversed using a heuristic to select a reachable object in the object graph.

In Step 404, it is determined whether the selected object is a local object. Determining whether an object is local or shared may be performed by examining the sharing status of the current shape assigned to the object. If the selected object is already shared, then execution proceeds with Step 406 below, to attempt to share the next reachable object.

Otherwise, in Step 408, it is determined whether a shape cached in a node corresponding to the selected object in a sharing code tree cache matches the current shape assigned to the selected object. In one or more embodiments, the purpose of the sharing code tree cache is to improve the performance of structurally checking an object graph, by caching a specialized object graph that may be quickly compared to an object graph corresponding to a set of reachable objects. If the shapes match, then the sharing code tree cache has optimized performance by simplifying the shape checking of an object graph to be just a few shape checks and field reads. Furthermore, the incremental overhead of sharing may be reduced to just changing a few object shapes. For example, matching the shapes may be performed via a pointer comparison (e.g., between a pointer to a shape cached in a node of the sharing code tree cache and a pointer to the current shape assigned to the selected object).

In one or more embodiments, the nodes of the sharing code tree cache may be AST nodes that are specialized to the specific shapes of previously shared objects. In one or more embodiments, the sharing code tree cache may store the most recent actual shapes of objects in the object graph, based on the optimistic premise (e.g., fundamental to any caching strategy) that recently shared shapes will likely be reused in object graphs in the near future.

Initially, the sharing code tree cache may be empty, in which case there will not be a match. During a later iteration of the process of FIG. 4 (i.e., the loop from Step 402 to Step 410), a node corresponding to the selected object may exist in the sharing code tree cache.

If the cached shape and the current shape assigned to the selected object match, then in Step 410, a new, shared shape is assigned to the selected object, where the new shape is a variant of the cached shape, with the sharing status set to "shared". Since the cached shape and the current shape assigned to the selected object have matched, they may be considered to be equivalent. Therefore, the new, shared shape may have the same fields and types as the cached shape, where the only difference between the cached shape and the new, shared shape is the difference in sharing status. Now that the selected object has been shared, execution proceeds with Step 406 below, to attempt to share the next reachable object.

Otherwise, if the cached shape fails to match the current shape assigned to the selected object, then in Step 412, the corresponding cached node is invalidated, and a deoptimized shape check is performed. In one or more embodiments, the deoptimized shape check may be a comprehensive check based on the actual detailed shape of the selected object (e.g., as indicated in the object storage corresponding to the selected object, since, as a dynamic object, the selected object may have been re-shaped since the current shape was assigned to the object).

In one or more embodiments, the shape functions as a guard that is used to select between optimized code (e.g., in the sharing code tree cache) and deoptimized code. Dynamically selecting between optimized code and deoptimized code may be facilitated using the Truffle language implementation framework (see, e.g., T. Würthinger, A. Woβ, L. Stadler, G. Duboscq, D. Simon, and C. Wimmer, Self-Optimizing AST Interpreters, in Proceedings of the 8th Dynamic Languages Symposium, DLS'12, pages 73-82, October 2012).

In Step 414, a new node is cached that performs a shape check on the selected object, and the assignment of the new, shared shape to the selected object. In one or more embodiments, the shape check performed by the cached node may be based on the deoptimized shape check performed above in Step 412. In one or more embodiments, the shape check performed by the cached node may check whether a cached shape matches a current shape assigned to the selected object. Execution then proceeds with Step 410 above, to assign the new, shared shape to the selected object.

Finally, in Step 406, if there are more reachable objects in the object graph (i.e., that have not yet been selected) then the loop from Step 402 to Step 410 repeats with another selected object from the set of reachable objects.

In one or more embodiments, the process for sharing objects in FIG. 4 may be implemented in a bottom-up fashion, where the leaf objects in the object graph (i.e., objects which do not have any additional reachable objects) are shared before sharing the non-leaf objects in the object graph.

Using the sharing code tree cache has been shown to improve performance in a benchmark by a factor of almost 35x. Without this optimization, an object may be shared using a generic routine that checks every field of the object, collects object references, and then performs the same analysis recursively on the referenced objects until all reachable objects are shared. Using the sharing code tree cache on the AST level, sharing the object is nearly instantaneous. The compiler sees the structure of the checks at compilation time and can fold all shape checks, field reads, and shape changes. In addition, it allocates the object only just before assigning it to a field that is visible from another thread, which makes it possible to construct the object directly with the right values.

Figure 5:
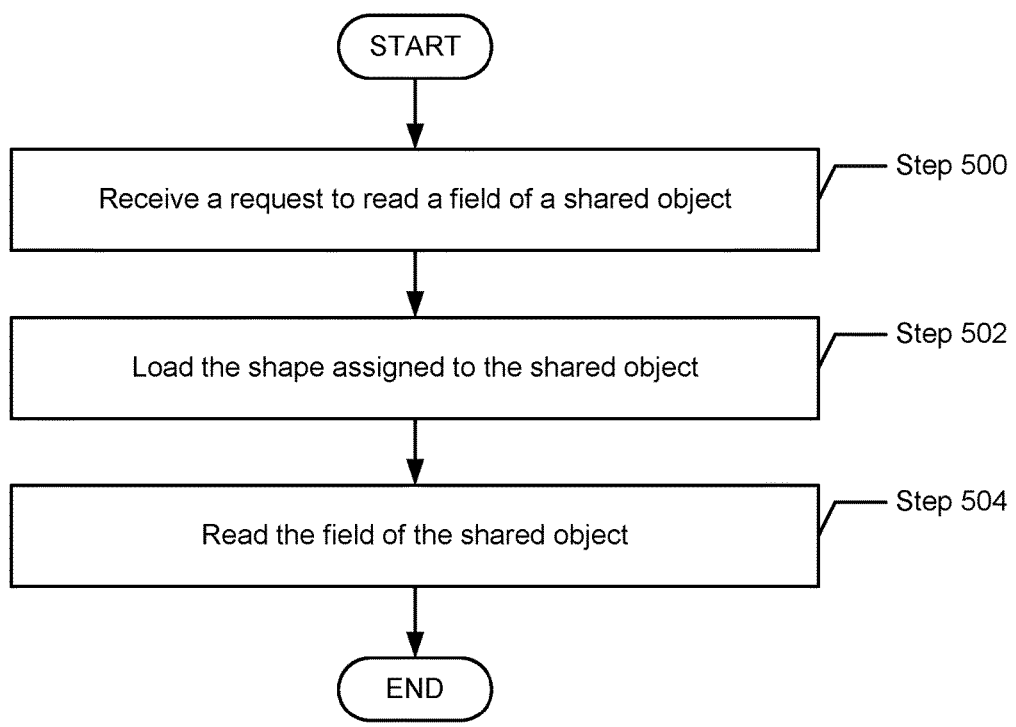

FIG. 5 shows a flowchart in accordance with one or more embodiments of the invention. The flowchart depicts a process for a read operation. One or more of the steps in FIG. 5 may be performed by the components of the computer system (100), discussed above in reference to FIG. 1. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

In Step 500, a request is received to read a field of a shared object. In one or more embodiments of the invention, the request may be received from any entity. For example, the dynamically-typed language program may reach a point in execution requiring a read of a shared object. As another example, a user of a program written in a dynamically-typed language may perform an action that requires a read of a shared object. In one or more embodiments of the invention, the object to be read is identified as a shared object based on the shape of the object. In one or more embodiments of the invention, if an object becomes reachable from other threads, a read operation to the object may, before beginning performance of the read, perform a check to determine whether the object is marked as a shared object (e.g., via checking the shape of the object).

In Step 502, the shape of the shared object is loaded.

In Step 504, the field of the shared object is read. In one or more embodiments, no synchronization or waiting is required when performing a read.

The following example is for explanatory purposes only and not intended to limit the scope of the invention. FIG. 6A, FIG. 6B, FIG. 6C, and FIG. 6D show an implementation example in accordance with one or more embodiments of the invention. FIG. 6A shows an object graph (600), starting with a rectangle object (602), which includes references to two XY coordinate objects (604, 606). The object graph (600) corresponds to objects created by a program executing in a single thread. The rectangle object (602) is assigned a rectangle shape (610) that includes metadata (614) about the types of values expected in the fields (612) of the rectangle object (602). The metadata (614) indicates that there are two fields (612): "top left" and "bottom right", both of which are expected to contain values with an XY coordinate type. The rectangle shape (610) also includes a sharing status (615), which is set to "local", indicating that the rectangle object (602) is local to a thread. The values of both fields in the rectangle object (602) are stored in the fixed storage portion of the object storage corresponding to the rectangle object (602).

Each XY coordinate object (604, 606) is assigned an XY coordinate shape (620) that includes metadata (624) about the types of values expected in the fields (622) of each XY coordinate object (604, 606). The metadata (624) indicates that there are two fields (622): "X" and "Y", both of which are expected to contain values with an integer type. The XY coordinate shape (620) also includes a sharing status (625), which is also set to "local", indicating that the XY coordinate objects (604, 606) are local to a thread. The values of both fields in the XY coordinate objects (604, 606) are stored in the fixed storage portion of the object storage corresponding to the XY coordinate objects (604, 606).

Figure 6B:
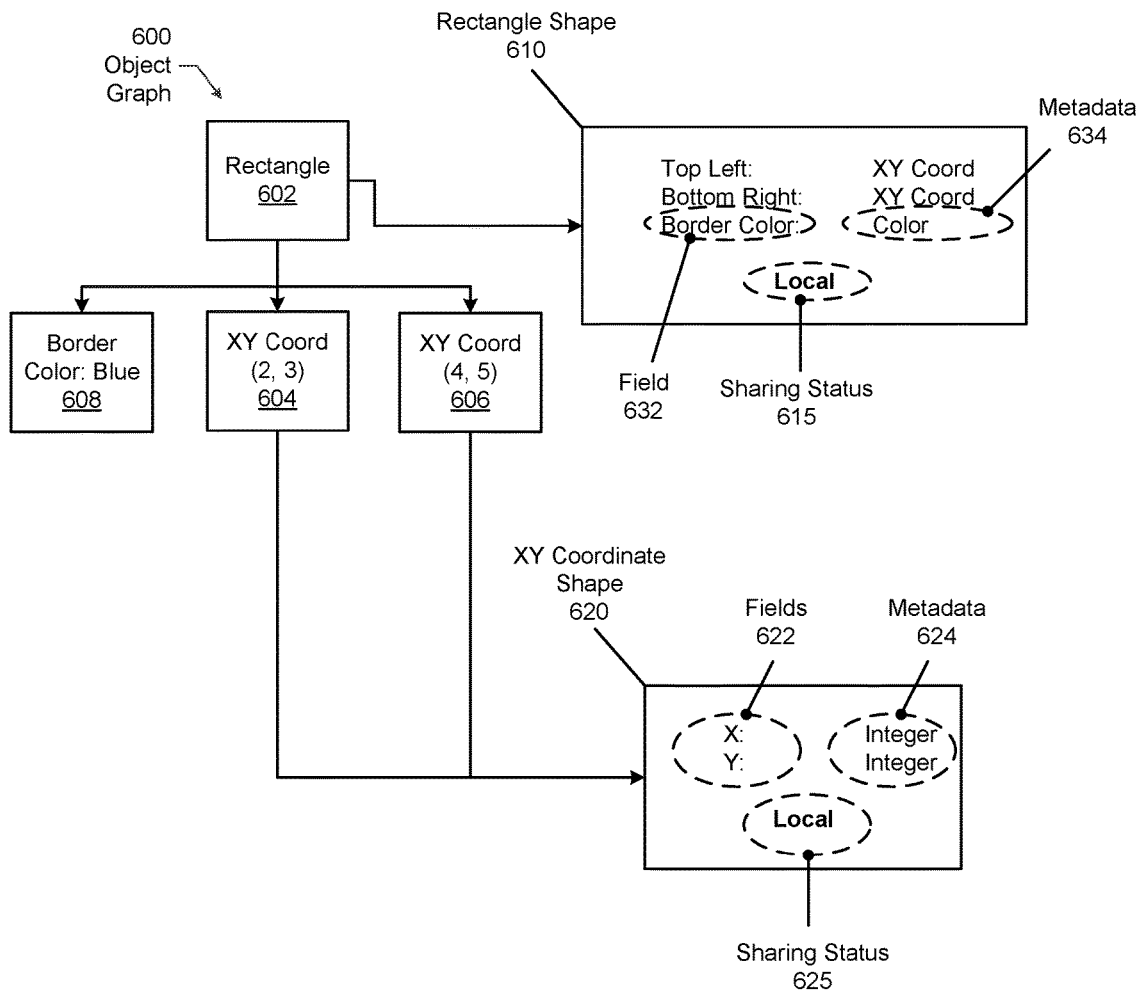

FIG. 6B illustrates the addition of a "border color" field (608) to the rectangle object (602). The "border color" field (632) and corresponding metadata (634) are added to the rectangle shape (610). The metadata (634) indicates that the expected type of value of the border color field (632) is "color". In this example, the fixed storage area corresponding to the rectangle object (602) is full (e.g., the fixed storage area contains space to hold two fields). Therefore, the value of the border color field (632) is stored in the extended storage portion of the object storage corresponding to the rectangle object (602).

Figure 6C:
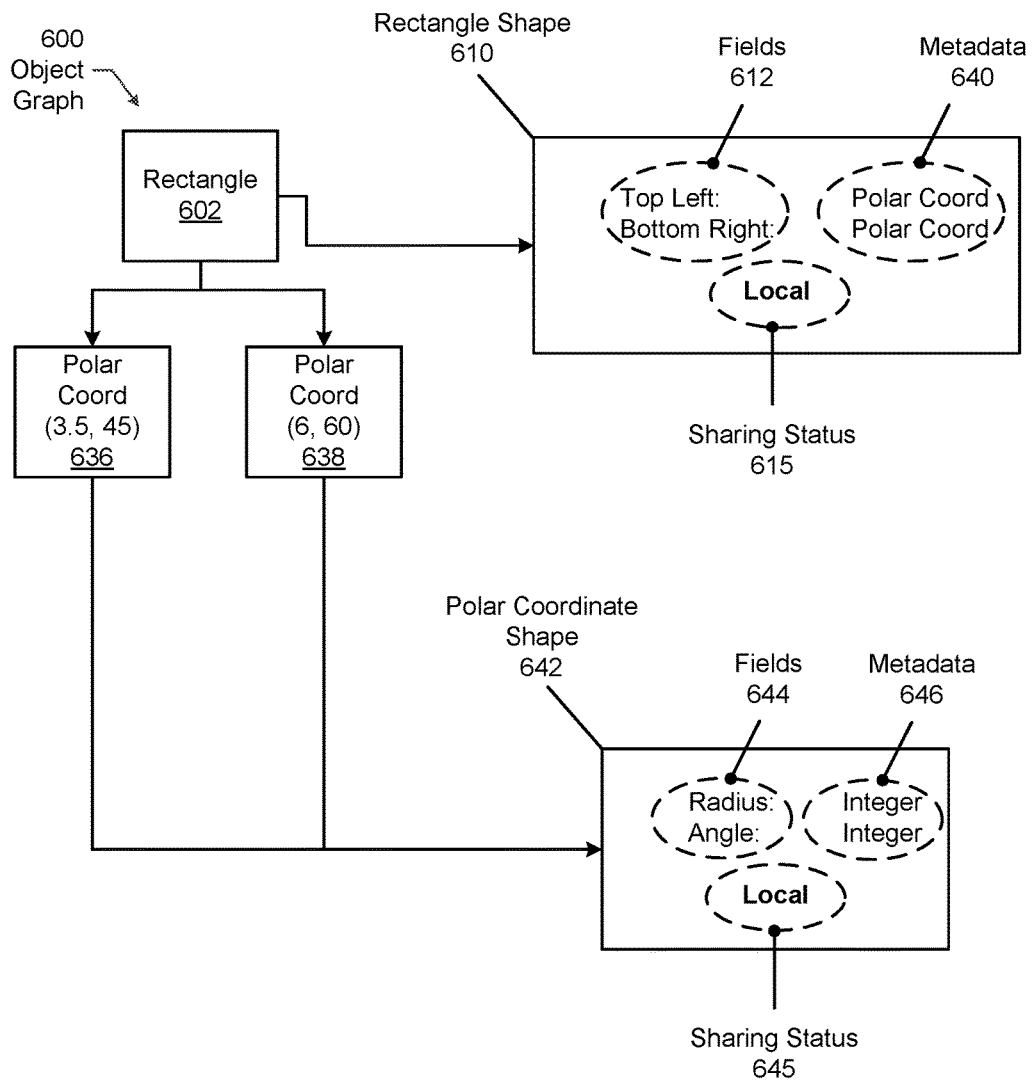
Figure 6D:
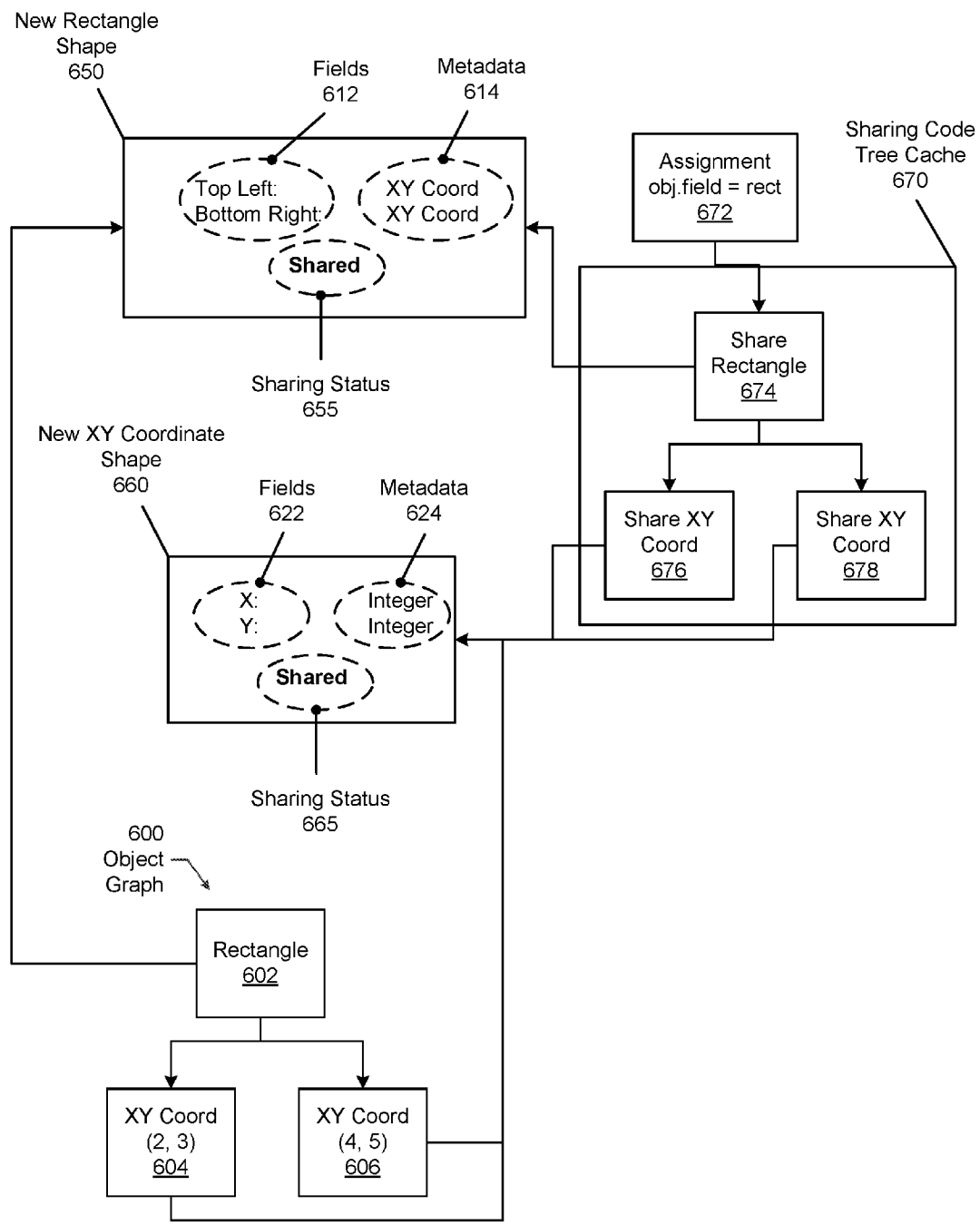

FIG. 6C illustrates using polar coordinate objects (636, 638) to represent the position of the rectangle object (602) (e.g., instead of the XY coordinate objects (604, 606) of FIG. 6A). The metadata (640) of the rectangle shape (610) is updated to indicate the expected type of the top left and bottom right fields (612) is now "polar coordinate". To avoid reusing object storage with values of a different type, and since the fixed storage area corresponding to the rectangle object (602) is already full, the polar coordinate values of the top left and bottom right fields (612) are stored in new storage locations in the extended storage portion of the object storage corresponding to the rectangle object (602).

Each polar coordinate object (636, 638) is assigned a polar coordinate shape (642) that includes metadata (646) about the types of values expected in the fields (644) of each polar coordinate object (636, 638). The metadata (646) indicates that there are two fields (644): "radius" and "angle", both of which are expected to contain values with an integer type. The polar coordinate shape (642) also includes a sharing status (645), which is set to "local", indicating that the polar coordinate objects (636, 638) are local to a thread. The values of both fields in the polar coordinate objects (636, 638) are stored in the fixed storage portion of the object storage corresponding to the polar coordinate objects (636, 638).

FIG. 6D illustrates a scenario where a second concurrent thread of execution has been initiated, initiating the tracking of shared objects. The rectangle object (602) is shared once it is stored in a shared object, for example, in an assignment (672) to a field of a shared object. Sharing the rectangle object (602) triggers the sharing of the objects reachable from the rectangle object (602), in this case the two XY coordinate objects (604, 606) to which the rectangle object (602) contains references.

A sharing code tree cache (670) is used as a performance optimization to quickly perform shape checks on the objects to be shared. Shape checks may be performed in dynamically-typed programs to check whether an expected shape of an object (e.g., as indicated in metadata in the shape of the object) matches the actual structure of the object (e.g., since the object may have been reshaped after the metadata was written). The sharing code tree cache (670) is a cached structure that facilitates efficient sharing of the object graph (600), if the shapes of the objects (602, 604, 606) in the object graph (600) match the shapes of the corresponding nodes (674, 676, 678) of the sharing code tree cache (670).

In FIG. 6D, the cached structure consists of three nodes: a share rectangle node (674) and two shared XY coordinate nodes (676, 678).

Sharing of the object graph (600) starting with the rectangle object (602) proceeds as follows. The shape cached in the corresponding node (674) of the sharing code tree cache (670) is compared to the current shape (i.e., (610) of FIG. 6A) assigned to the rectangle object (602). If the shapes fail to match, or if the sharing code tree cache (670) did not yet include a node corresponding to the rectangle object (602), then optimized sharing using the sharing code tree cache (670) is not possible. Instead a deoptimized shape check would be performed on the rectangle object (602) and each of the objects (604, 606) reachable from the rectangle object (602). The results of the deoptimized sharing process may then be used to generate nodes to be added to the sharing code tree cache (670), to perform subsequent optimized sharing of rectangle objects in the future (e.g., in additional threads initiated by the program).

Each node (674, 676, 678) of the sharing code tree cache (670) may be an AST node. Each node (674, 676, 678) in the sharing code tree cache (670) performs a shape check relative to a specialized shape cached in the node (674, 676, 678), where the specialized shape corresponds to an object (e.g., the rectangle object (602) and the XY coordinate objects (604, 606)) in the object graph (600). In addition, each node (674, 676, 678) in the sharing code tree cache (670) also performs the assignment of a new, shared shape to the corresponding object to be shared.

Assuming that the current shape (i.e., (610) of FIG. 6A) assigned to the rectangle object (602) matches the shape cached in the corresponding node (674) of the sharing code tree cache (670), the sharing process then assigns a new rectangle shape (650) to the rectangle object (602). The new rectangle shape (650) is identical to the current rectangle shape (e.g., (610) in FIG. 6A), except that the sharing status (655) has been set to "shared". The sharing process then continues, recursively, by sharing the objects reachable from the rectangle object (602), that is, the two XY coordinate objects (604, 606). Assuming that the current shape (i.e., (620) of FIG. 6A) assigned to one of the XY coordinate objects (604, 606) matches the shape cached in the corresponding node (676, 678) of the sharing code tree cache (670), the sharing process then assigns a new XY coordinate shape (660) to the corresponding XY coordinate object (604, 606). The new XY coordinate shape (660) is identical to the current shape (e.g., (620) in FIG. 6A), except that the sharing status (665) has been set to "shared". The sharing process then completes since there are no additional objects reachable from any of the objects (602, 604, 606) in the object graph (600).

The sharing process may be implemented using pre-order traversal, where the leaf objects (e.g., 604, 606) in the object graph (600) (i.e., the objects which do not have any additional reachable objects) are shared after sharing the non-leaf objects (e.g., 602) in the object graph (600). That is, since an object graph (600) may be cyclic, it may be important to mark objects (602, 604, 606) as shared before visiting their children objects in order to avoid cycling through the object graph (600), so that if the same object (602, 604, 606) is encountered more than once, that object will already be marked as shared. Otherwise, it may be necessary to incur the overhead of using an external data structure to track which objects have already been traversed.

Once the sharing process has been completed, the rectangle object (602) and its reachable objects are tracked as shared objects. For example, writing to the rectangle object (602) (e.g., to re-position the rectangle object (602) by modifying the XY coordinate objects (604, 606)) will now cause a lock to be acquired on the rectangle object (602) for the duration of the write operation.

Embodiments disclosed herein may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 7B:
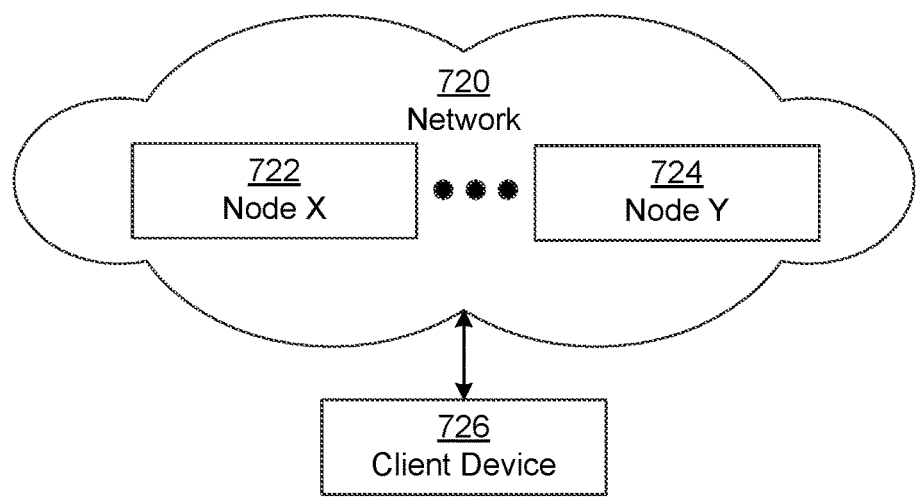

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments disclosed herein.

The computing system or group of computing systems described in FIG. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/ or client device in FIG. 7B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    creating a plurality of objects by executing a program in a first thread, wherein creating the plurality of objects comprises allocating, for each object of the plurality of objects, storage based on a shape assigned to the object, wherein the storage comprises a plurality of separate, non-reusable storage locations,
        wherein each storage location corresponds to a field of the object, and
        wherein the shape comprises a sharing status and a mapping of each field of the object to a storage location;
    detecting that the program is initiating a second concurrent thread of execution;
    designating a subset of the plurality of objects as shared objects to obtain a plurality of shared objects, wherein designating the subset of the plurality of objects as shared objects comprises setting the sharing status of the shape assigned to each object in the plurality of shared objects to indicate that the object is shared;
    initiating tracking of the plurality of shared objects; and
    implementing a write barrier when writing to the plurality of shared objects.

2. The method of claim 1, wherein implementing the write barrier comprises:
    receiving a request to perform a write to a first field of a shared object of the plurality of shared objects;
    acquiring, based on the request, a lock on the shared object before performing the write;
    allocating a new separate, non-reusable storage location for the first field;
    performing the requested write to the new separate, non-reusable storage location; and
    updating the shape assigned to the shared object, wherein the mapping of the shape assigned to the shared object further comprises the correspondence of the first field to the new storage location.

3. The method of claim 1, wherein implementing the write barrier comprises:

receiving a request to write to a first field of a shared object of the plurality of shared objects by storing, in the first field, a reference to a local object of the plurality of objects;
acquiring, based on the request, a lock on the shared object before performing the write;
determining a current sharing status of a current shape assigned to the local object;
assigning, based on the current sharing status, a new shape to the local object, wherein the new shape is a variant of the current shape with a sharing status indicating that the local object is shared; and
performing the requested write by storing the reference to the local object in a storage location corresponding to the first field.

4. The method of claim 3, further comprising:
    determining, by traversing an object graph beginning with the local object, that the local object comprises a plurality of reachable objects that are reachable from the local object;
    determining whether each reachable object is assigned a shape with a sharing status indicating that the reachable object is shared; and
    assigning a new shape to the reachable object, wherein the new shape is a variant of the shape assigned to the reachable object with a sharing status indicating that the reachable object is shared.

5. The method of claim 4, further comprising:
    incrementally generating a sharing code tree cache comprising a plurality of nodes, wherein each node of the plurality of nodes corresponds to a reachable object in the object graph,
        wherein each node stores a cached shape corresponding to the reachable object, wherein each node compares the cached shape to the current shape assigned to the corresponding reachable object, and
        wherein each node assigns the new shape to the corresponding reachable object; and
    invalidating the node when the cached shape stored in the node fails to match the current shape assigned to the corresponding reachable object.

6. The method of claim 1, further comprising:
    receiving a request to read a first field of a shared object of the plurality of shared objects;
    loading the shape assigned to the shared object; and
    reading, after loading the shape, the first field.

7. The method of claim 1, wherein each storage location stores a single type of value.

8. A system, comprising:
    a processor;
    a memory comprising instructions that, when executed by the processor, cause the processor to:
        create a plurality of objects by executing a program in a first thread, wherein creating the plurality of objects comprises allocating, for each object of the plurality of objects, storage based on a shape assigned to the object,
            wherein the storage comprises a plurality of separate, non-reusable storage locations,
            wherein each storage location corresponds to a field of the object, and
            wherein the shape comprises a sharing status and a mapping of each field of the object to a storage location;
        detect that the program is initiating a second concurrent thread of execution;

designate a subset of the plurality of objects as shared objects to obtain a plurality of shared objects, wherein designating the subset of the plurality of objects as shared objects comprises setting the sharing status of the shape assigned to each object in the plurality of shared objects to indicate that the object is shared;

initiate tracking of the plurality of shared objects; and implement a write barrier when writing to the plurality of shared objects.

9. The system of claim 8, wherein implementing the write barrier comprises:

receiving a request to perform a write to a first field of a shared object of the plurality of shared objects;

acquiring, based on the request, a lock on the shared object before performing the write;

allocating a new separate, non-reusable storage location for the first field;

performing the requested write to the new separate, non-reusable storage location; and updating the shape assigned to the shared object, wherein the mapping of the shape assigned to the shared object further comprises the correspondence of the first field to the new storage location.

10. The system of claim 8, wherein implementing the write barrier comprises:

receiving a request to perform a write to a first field of a shared object of the plurality of shared objects by storing, in the first field, a reference to a local object of the plurality of objects;

acquiring, based on the request, a lock on the shared object before performing the write;

determining a current sharing status of a current shape assigned to the local object;

assigning, based on the current sharing status, a new shape to the local object, wherein the new shape is a variant of the current shape with a sharing status indicating that the local object is shared; and performing the requested write by storing the reference to the local object in a storage location corresponding to the first field.

11. The system of claim 10, wherein the memory further comprises instructions that, when executed by the processor, cause the processor to:

determine, by traversing an object graph beginning with the local object, that the local object comprises a plurality of reachable objects in the object graph that are reachable from the local object;

determine whether each reachable object is assigned a shape with a sharing status indicating that the reachable object is shared; and assign a new shape to the reachable object, wherein the new shape is a variant of the shape assigned to the reachable object with a sharing status indicating that the reachable object is shared.

12. The system of claim 11, wherein the memory further comprises instructions that, when executed by the processor, cause the processor to:

incrementally generate a sharing code tree cache comprising a plurality of nodes, wherein each node of the plurality of nodes corresponds to a reachable object in the object graph, wherein each node stores a cached shape corresponding to the reachable object, wherein each node compares the cached shape to the current shape assigned to the corresponding reachable object, and wherein each node assigns the new shape to the corresponding reachable object; and invalidate the node when the cached shape stored in the node fails to match the current shape assigned to the corresponding reachable object.

13. The system of claim 8, wherein the memory further comprises instructions that, when executed by the processor, cause the processor to:

receive a request to read a first field of a shared object of the plurality of shared objects;

load the shape assigned to the shared object; and read, after loading the shape, the first field.

14. The system of claim 8, wherein each storage location stores a single type of value.

15. A non-transitory computer readable medium comprising instructions that, when executed by a processor, perform a method comprising:

creating a plurality of objects by executing a program in a first thread, wherein creating the plurality of objects comprises allocating, for each object of the plurality of objects, storage based on a shape assigned to the object, wherein the storage comprises a plurality of separate, non-reusable storage locations, wherein each storage location corresponds to a field of the object, and wherein the shape comprises a sharing status and a mapping of each field of the object to a storage location;

detecting that the program is initiating a second concurrent thread of execution;

designating a subset of the plurality of objects as shared objects to obtain a plurality of shared objects, wherein designating the subset of the plurality of objects as shared objects comprises setting the sharing status of the shape assigned to each object in the plurality of shared objects to indicate that the object is shared;

initiating tracking of the plurality of shared objects; and implementing a write barrier when writing to the plurality of shared objects.

16. The non-transitory computer readable medium of claim 15, wherein implementing the write barrier comprises:

receiving a request to perform a write to a first field of a shared object of the plurality of shared objects;

acquiring, based on the request, a lock on the shared object before performing the write;

allocating a new separate, non-reusable storage location for the first field;

performing the requested write to the new separate, non-reusable storage location; and updating the shape assigned to the shared object, wherein the mapping of the shape assigned to the shared object further comprises the correspondence of the first field to the new storage location.

17. The non-transitory computer readable medium of claim 15, wherein implementing the write barrier comprises:

receiving a request to perform a write to a first field of a shared object of the plurality of shared objects by storing, in the first field, a reference to a local object of the plurality of objects;

acquiring, based on the request, a lock on the shared object before performing the write;

determining a current sharing status of a current shape assigned to the local object;

assigning, based on the current sharing status, a new shape to the local object, wherein the new shape is a variant of the current shape with a sharing status indicating that the local object is shared; and performing the requested write by storing the reference to the local object in a storage location corresponding to the first field.

18. The non-transitory computer readable medium of claim 17, wherein the method further comprises:
   determining, by traversing an object graph beginning with the local object, that the local object comprises a plurality of reachable objects in the object graph that are reachable from the local object;
   determining whether each reachable object is assigned a shape with a sharing status indicating that the reachable object is shared; and
   assigning a new shape to the reachable object, wherein the new shape is a variant of the shape assigned to the reachable object with a sharing status indicating that the reachable object is shared.

19. The non-transitory computer readable medium of claim 18, wherein the method further comprises:
   incrementally generating a sharing code tree cache comprising a plurality of nodes,
   wherein each node of the plurality of nodes corresponds to a reachable object in the object graph,
   wherein each node stores a cached shape corresponding to the reachable object,
   wherein each node compares the cached shape to the current shape assigned to the corresponding reachable object, and
   wherein each node assigns the new shape to the corresponding reachable object; and
   invalidating the node when the cached shape stored in the node fails to match the current shape assigned to the corresponding reachable object.

20. The non-transitory computer readable medium of claim 15, wherein the method further comprises:
   receiving a request to read a first field of a shared object of the plurality of shared objects;
   loading the shape assigned to the shared object; and
   reading, after loading the shape, the first field.

* * * * *

UNITED STATES PATENT AND TRADEMARK OFFICE
CERTIFICATE OF CORRECTION

PATENT NO. : 10,248,349 B2
APPLICATION NO. : 15/279564
DATED : April 2, 2019
INVENTOR(S) : Benoit Daloze et al.

It is certified that error appears in the above-identified patent and that said Letters Patent is hereby corrected as shown below:

On the Title Page

On page 2, item (56) under OTHER PUBLICATIONS, occurring in the first reference cited, the name "Hölzle" should read "Hölzle".

Signed and Sealed this
Eighteenth Day of June, 2019

Andrei Iancu
*Director of the United States Patent and Trademark Office*